United States Patent [19]

Mes

[11] 4,417,285
[45] Nov. 22, 1983

[54] STOP MOTION SYSTEM FOR PLAYING BACK A PROGRAM RECORDED ON A DISC-SHAPED RECORD CARRIER

[75] Inventor: Johannes A. M. Mes, Eindhoven, Netherlands

[73] Assignee: U.S. Philips Corporation, New York, N.Y.

[21] Appl. No.: 795,239

[22] Filed: May 9, 1977

[30] Foreign Application Priority Data

Mar. 17, 1977 [NL] Netherlands ............................. 02874

[51] Int. Cl.³ ............................................. H04N 5/85
[52] U.S. Cl. .................................... 358/342; 360/10.1; 360/35.1; 360/72.2; 369/111; 358/346
[58] Field of Search ................ 358/214, 54, 128, 127, 358/131, 130, 132, 140, 147; 179/100.3 V, 100.3 D, 100.4 D; 360/10, 9, 37, 35, 33, 72

[56] References Cited

U.S. PATENT DOCUMENTS

| | | | |
|---|---|---|---|
| 3,366,733 | 1/1968 | Frohbach | 179/100.3 V |
| 3,854,015 | 12/1974 | Janssen | 179/100.3 D |
| 3,911,211 | 10/1975 | Rennick | 179/100.3 D |
| 3,931,457 | 1/1976 | Mes | 360/72 |
| 3,947,870 | 3/1976 | Yumde | 358/147 |
| 4,057,832 | 11/1977 | Kappert | 360/10 |

Primary Examiner—Alan Faber
Attorney, Agent, or Firm—Jack Oisher; Robert T. Mayer; Algy Tamoshunas

[57] ABSTRACT

Prerecorded video discs will generally be provided with a program which has originally been recorded on film, which program is transformed into a television signal by scanning the film frames. Owing to the difference between the standards for film and television employed in the United States consecutive film frames always result in sets of unequal numbers of fields on the record carrier. Preferably an indication signal is added to each set of fields on the record carrier. The read apparatus comprises detection means for detecting said indication signal. This signal is used to ensure that in the still-picture mode, during which the same two fields on a track circumference of the record carrier are repeatedly read, two fields are read which belong to the same set and consequently stem from the same film frame.

4 Claims, 8 Drawing Figures

STOP MOTION SYSTEM FOR PLAYING BACK A PROGRAM RECORDED ON A DISC-SHAPED RECORD CARRIER

The invention relates to a system for playing back a program recorded on a disc-shaped record carrier, which system comprises a read apparatus for scanning the record carrier, said record carrier being provided with a spiral information track in which the program is recorded as a television signal in a sequence of two fields per track circumference, and consecutive scenes of the prgram on the record carrier being constituted by consecutive sets of fields, which consecutive sets comprise either two or three fields, preferably alternately two and three in accordance with a specific pattern, and the read apparatus being provided with control means for realizing a still-picture mode, in which mode continually the same two consecutive fields are read by the repeated scanning of the same track circumference.

Currently disc-shaped record carriers command much interest as a storage medium for video information. This applies in particular to disc-shaped record carriers on which this video information is recorded in optically coded form. For reading these record carriers a read apparatus is employed which uses an optical scanning system. With the aid of a beam of radiation a scanning spot is projected onto the record carrier and information which is contained in this radiation beam after interaction with the record carrier is detected and converted into a television signal which is suitable for reproduction via a standard television receiver. Control systems, which may inter alia comprise deflection means interposed in the radiation beam, ensure that the scanning spot always coincides with the spiral information track on the record carrier. Such read apparatus, in particular the control system used therein, is inter alia described in U.S. Pat. No. 3,854,015, which is incorporated herein by reference.

The major advantage of using an optical coding on the record carrier in conjunction with an optical scanning system is that scanning is entirely contactless, so that the risk of damage to the record carrier is nill irrespective of movements of the scanning spot over the record carrier. During read-out this inter alia provides the possibility of using a still-picture mode, which possibility is comprehensively described in the said United States Patent. In this still-picture mode the scanning spot is moved back radially by one track pitch after every revolution of the record carrier with the aid of the deflection means, so that continually the same track circumference of the spiral track is scanned. As exactly two fields are recorded in one track circumference, which fields together constitute the interlaced television image, one specific picture of the recorded television signal is reproduced continuously in the still-picture mode.

Said record carriers are primarily intended to be provided with a program by the factory and thus to be made available to the consumer as prerecorded record carriers. The most likely program material for this type of prerecorded record carrier is constituted by film material, because this is available in a large amount and in a wide variety in repertory. If a film program is be used for the manufacture of record carriers destined for the American market, a complication results from the difference between the standards for the reproduction of film images and those for the reproduction of television pictures.

To standard mainly used for film inter alia implies that 24 film frames per second are recorded and reproduced. In order to convert such a film into a video signal which is suitable for recording on said disc-shaped record carriers each film frame is scanned in accordance with a pattern of interlaced fields. However, in accordance with the United States television standard, however, only 30 pictures per second must be reproduced, so that it is not possible to transform one film frame into one television picture because then the playback speed of the recorded program would not be correct. The necessary adaptation can be obtained in known manner by programming the film scanner so that consecutive film frames are alternately converted into a set of two fields and a set of three fields. This means that two film frames are converted into five fields or four film frames into 10 fields or 5 television pictures, which correspond to a 24/30 conversion from the film standard into the television standard. In order to obtain this transformation it is not necessary per se to convert consecutive film frames into alternate sets of two and three fields. It is also possible to use a different sequential pattern. For example, as an alternative four consecutive film frames may be converted into consecutive sets of two, three, three and two fields. Any pattern with a period which is so short as not to be observed by the human eye may in principle be used.

If a read apparatus for disc-shaped record carriers is operated in the still-picture mode it is found that the reproduction quality is not always satisfactory when record carriers are used on which a television program is recorded which is obtained in the manner described above. Generally, the television picture which is reproduced in the still-picture mode exhibits an unsharpness and in the case of certain programs it is even completely unacceptable.

It is an object of the invention to remedy this and the invention is characterized in that to at least one of the fields which together constitute a pair of consecutive sets of television fields on the record carrier an indication signal is added and that the read apparatus is provided with detection means for the detection of this indication signal and with selection means which are coupled to said detection means and which co-operate with the control means, which selection means in conjunction with the control means select the two fields to be reproduced in the still-picture mode in response to the detected indication signal in such a way, that always two fields which belong to the same set of fields are reproduced in this mode.

The invention is based on the recognition that in the still-picture mode of the known read apparatus two interlaced fields may be reproduced which stem from two consecutive film frames. As the scenes recorded in two consecutive film frames generally differ slightly, in particular in the case of fast-moving scenes in the recorded program, the fields stemming from these individual film frames will also differ. If these fields are then combined to a television image by interlacing, an unsharp picture results.

This is avoided by the steps in accordance with the invention in that first of all during recording of the video signal on the record carrier an indication signal is added to each pair of consecutive sets of fields. By providing the read apparatus with detection means for detecting this indication signal it is achieved that information is available in respect of the field which is being read at that instant. During the still-picture mode this information can simply be employed for programming the control means via selection means controlled by this indication signal in such a way that in this mode always two fields are reproduced which stem from the same film frame.

Preferably an indication signal is added to each set of fields on the record carrier, because in that case the selection means can be very simple.

The added indication signal may for example also serve as an address signal, i.e. it may contain such a code that the indication signal after detection not only has the above-mentioned function in the still-picture mode, but that after decoding of the code which is contained in each individual indication signal a frame number associated with each film frame becomes available, which may for example be displayed on the television screen simultaneously with the reproduced television picture or via a separate display.

The invention will now be described in more detail with reference to the drawing, in which FIG. 1, including a–c, and 2 schematically represent the manner in which a film program is recorded on a disc-shaped record carrier, FIG. 3 schematically shows the read apparatus for such a disc-shaped record carrier, FIG. 4 in tabulated form shows the possible locations for the indication signal in consecutive sets of fields.

FIG. 1a schematically shows how a program recorded on film is reproduced. Each film frame (I through IV etc.) is consecutively reproduced for 1/24 second. If such a film program is to be converted into a television signal, it is at any rate necessary to ensure that this television signal sequentially represents the information content of 24 consecutive film frames per second, preferably in an as regular as possible a manner. To obtain a television signal in accordance with United States standards, which signal contains 30 fields per second, a conversion is necessary of which a possibility is represented in FIG. 1b.

FIG. 1b schematically represents the reproduction of a television signal which consists of 30 television pictures per second. Each television picture, as is known, consists of two interlaced fields. Within a time interval of 1/6 second in which 4 film frames (I through IV) are reproduced it is therefore necessary to reproduce 5 television pictures or 10 fields (1 through 10). In order to achieve this the film frames are converted in known manner into a television signal in a manner which changes from film frame to film frame with aid of film scanning equipment. The first film frame I is scanned in accordance with two fields 1+2 resulting in a television picture $S_1$ (FIG. 1c) consisting of these two interlaced fields 1+2. The second film frame II is first of all scanned in accordance with two fields 3+4, resulting in a television picture $S_2$ consisting of these two interlaced fields 3+4, but subsequently this film frame II is again scanned in accordance with a field 5. Thus in the television signal this film frame II is ultimately represented by three fields 3, 4 and 5. The next film frame III again yields two fields 6+7, film frame IV three fields 8, 9 and 10, etc.

The Figure readily shows that in the time interval (1/6 second) which is necessary for reproducing 4 film frames exactly 10 fields are reproduced, or 5 television pictures. Owing to the alternate sets of two and three fields per film frame the sequence of the original scenes recorded on the film will be slightly disturbed during normal reproduction, but because it is disturbed with a frequency of 12 Hz this is hardly perceptible to the human eye.

Figure 1:
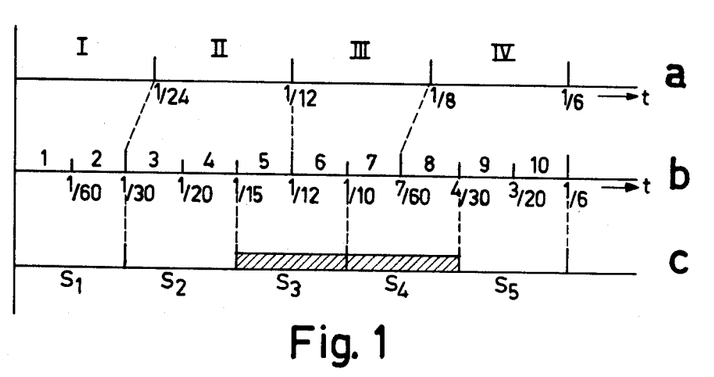

Instead of the conversion illustrated in FIG. 1 it is readily possible to select a conversion in accordance with which the film frames I and IV each result in two fields and the film frames II and III each in three fields. Moreover, a pattern of sets may be chosen which is divided among more than four film frames, each pattern obviously comprising an equal number of sets of two and of three fields.

If during read-out of a disc-shaped record carrier the still-picture mode is selected it is found that in certain cases an unacceptable picture, in particular an unsharp picture, is produced. It is found that such an unsharp picture in the still-picture mode may be attributed to the selected conversion of film frames into television signals. This is illustrated by means of FIG. 2 in combination with FIG. 1.

Figure 2:
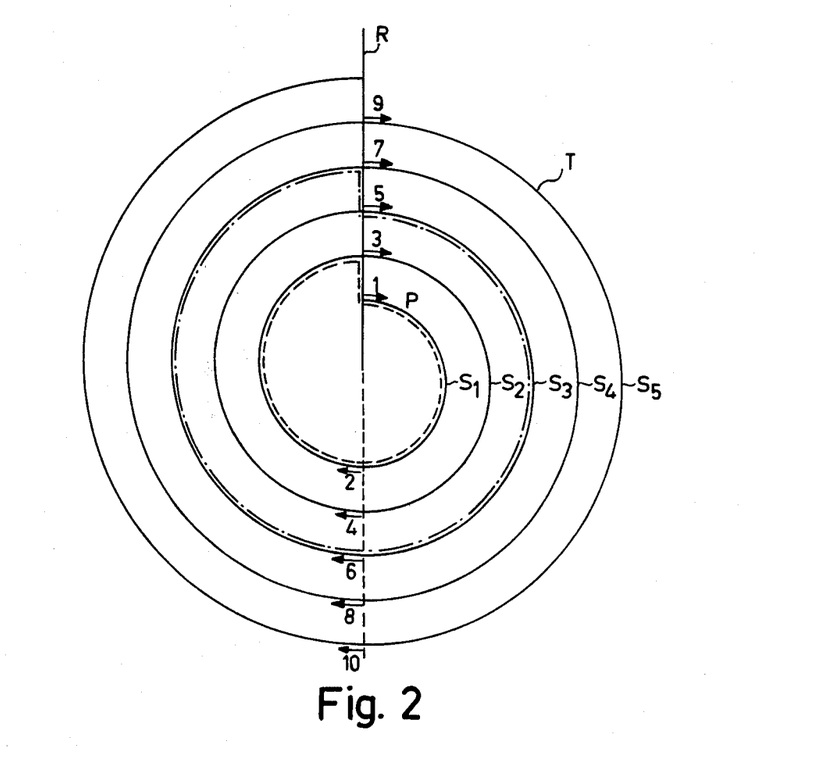

As previously stated, the video signal is recorded in a spiral track on the disc-shaped record carrier, each track circumference comprising two fields. FIG. 2 shows such a spiral track T. This track is scanned by a rotation of the record carrier in the direction P, namely from the inside towards the outside in the example shown. Assuming that recording of field 1 begins at the diameter R, the fields 1 through 10 will occupy the indicated track portions, i.e. the odd fields the track portions to the right of the diameter R and the even fields the track portions to the left of the diameter R. A sequence of an odd and an even field always constitutes one track circumference, corresponding to one television picture $S_1, S_2, \ldots S_5$.

In the still-picture mode of the playback apparatus one track circumference is scanned continuously in that the scanning spot is moved back radially over a distance equal to the track pitch of the spiral track upon each revolution of the record carrier, said movement being referred to hereinafter as track jump. Obviously, such a track jump is not effected at an arbitrary instant, but always during the vertical flyback of the reproduced television signal, in order not to disturb the displayed picture. Furthermore, it is common practice that the track jump coincides with the beginning of the odd fields by detection of the vertical synchronizing signal, so that in the still-picture mode pictures are always reproduced which consecutively consist of an odd and an even field, i.e. consecutive pictures $S_1, S_2, S_3$ etc. In the present example the track jump is therefore always effected at the location of the uninterrupted part of the diameter R.

In the still-picture mode the scanning spot for example scans the path indicated by the dashed line, so that the picture $S_1$ consisting of the fields 1 and 2 is reproduced. This is found to be an entirely correct picture. If in the still-picture mode the scanning spot scans the path indicated by the dash-dot line, the picture $S_3$ consisting of the fields 5+6 is reproduced. In FIG. 1 it can be seen that the two fields 5 and 6, which in interlaced form constitute said picture S₃, stem from two different film frames, namely the frame II and III respectively. These two fields will consequently represent different scenes which in the still-picture mode are then alternately reproduced for 1/60 sec., resulting in an unacceptable picture.

The picture $S_3$, consisting of the fields 5+6 is therefore not suitable for reproduction in the still-picture mode. The same applies to the picture $S_4$, consisting of the fields 7+8, as can readily be seen in FIG. 1.

In accordance with the invention indication signals are added to the recorded video signal in order to prevent these problems in the still-picture mode of the read apparatus. These indication signals are detected during read-out and together with the selection means, which are responsive to these indication signals, they ensure that in the still-picture mode only combinations of two fields which stem from the same film frame are reproduced.

Figure 3:
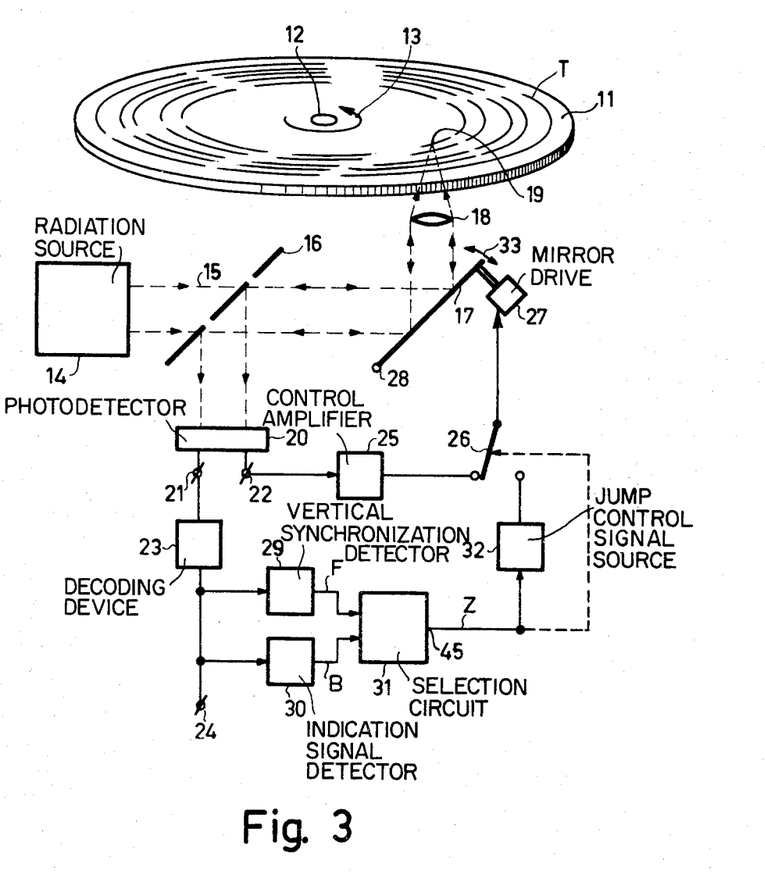

To explain the operation of the apparatus in accordance with the invention FIG. 3 schematically shows an embodiment of an optical read apparatus. This read apparatus largely corresponds to that shown and comprehensively described in the said U.S. Pat. No. 3,854,015.

The disc-shaped recorder carrier 11 is driven in a rotary sense 13 about its center 12 and comprises a spiral information track T. The optical scanning system comprises a radiation source 14 which produces a radiation beam 15. This radiation beam is focussed to a scanning spot 19 via the semi-transparent mirror 16, the mirror 17 and the lens 18. After reflection the radiation beam is again incident on the mirror 17, and the semi-transparent mirror 16 by which it is partly reflected to a detector 20. This detector first of all serves to detect the video information contained in the radiation beam and make it available at a terminal 21.

Moreover, it is assumed that the radiation beam which is incident on the detector 20 contains information relating to the radial position of the scanning spot 19 relative to the information track, which results in a control signal at the terminal 22. Systems for obtaining this information relating to the radial position of the scanning spot are known in multitude of variants. As it is irrelevant for the present invention which system is used for this purpose, reference is merely made by way of example to the possibilities described in the said United States Patent. The control signal which is available at the terminal 22 is applied to a drive means 27 via a control amplifier 25 and the switch 26, which drive means can rotate the rotatably journalled (point 28) mirror 17 in the direction 33. Thus a closed control system is obtained for controlling the radial position of the scanning spot 19, so that it is ensured that the scanning spot 19 always coincides with the information track T.

In the still-picture mode of the read apparatus the scanning spot 19 should radially be moved back by one track pitch of the spiral track upon every revolution of the record carrier 11. In order to achieve this the control loop of the radial tracking system is briefly rendered inoperative once per revolution of the record carrier, in that for example this loop is interrupted by the change-over of the switch 26. During this short time a signal source 32 then supplies a suitable control signal (jump signal) to the drive means 27 via the switch 26, so that the mirror 17 is rotated in such a way that the scanning spot 19 is rapidly moved by one track pitch in the radial direction. Subsequently, the control loop is again closed by means of the switch 26, so that during the rest of the revolution of the record carrier the information track is than followed correctly.

The control signal for the switch 26 and the signal source 32 is supplied by a selection circuit 31, which has two inputs which are connected to two separate detection circuits. Both detection circuits receive the television signal which is taken from the terminal 21 of the detector 20 and which is decoded with the aid of a decoding device 23, from which signal they extract the vertical synchronizing signals F (detector 29) and the indication signals B (detector 30). The detection of the two signals jointly defines the instant in the still-picture mode at which the control loop of the radial tracking system is interrupted and the jump signal is applied to the drive means 27 of the mirror 17, in other words the instant at which the track jump of the scanning spot is performed.

By a suitable choice of the position of the indication signal within a set of fields on the record carrier in conjunction with a suitable design of the selection circuit it is then possible to ensure that in the still-picture mode always two fields are reproduced which stem from one and the same film frame. In respect of the position of the indication signal within the sets of fields on the disc in conjunction with the design of the selection circuit there are a number of possibilities. The most significant possibilities are schematically shown in FIG. 1 in the form of a table.

Figure 4:
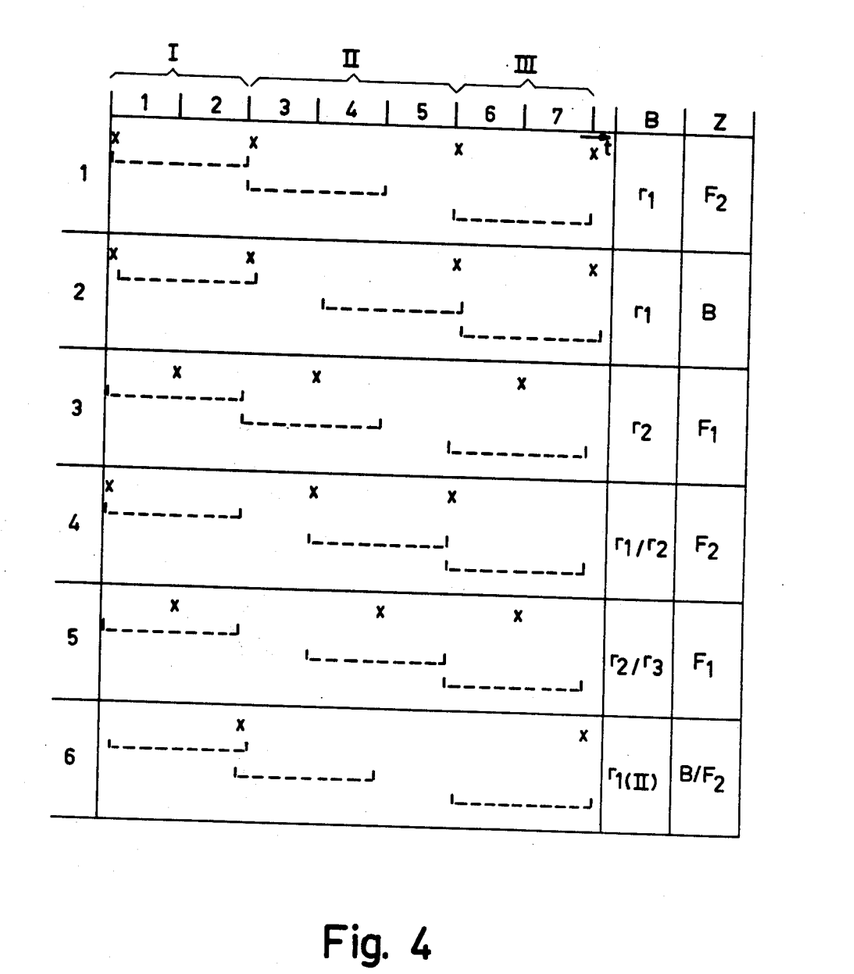

In FIG. 4 in the upper part of the table fields are indicated along a time axis 7, showing that the fields 1 and 2 stem from film frame I, fields 3, 4 and 5 from film frame II, and fields 6 and 7 from film frame III. In a number of rows 1 through 6 several possibilities for the location of the indication signal are give, which location is further specified in column B. Column Z indicates at which instant the track jump occurs.

For the sake of clarity possibility 1 is considered first. As is indicated in the table by crosses an indication signal is added to the first field ($R_1$) of each set (I, II, etc.) of fields, i.e. to the fields 1, 3, 6, 8 etc. It is evident that this indication signal is included in the non-visible part of the television signal, i.e. in the vertical blanking period, namely after the vertical synchronizing signal. The selection circuit in the playback apparatus may now be designed so that the control signal which causes the track jump in the still-picture mode is produced by the second vertical synchronizing signal (represented by $F_2$ in column Z) after detection of the indication signal. If the still-picture mode is switched on and subsequently the indication signal associated with field 1 is detected, the vertical synchronizing signal which appears after read-out of field 2 will cause the track jump of the scanning spot, which means that the fields 1+2 are reproduced as a still picture.

If switching to the still-picture mode is effected one picture later, which will be explained subsequently, the scanning spot keeps following the information track until the next indication signal is (field 3) detected, after which the second vertical synchronizing signal which is detected after this again initiates the track jump, so that the fields 3+4 are then reproduced as a still-picture. As is apparent from the table it is thus ensured that the number of possibilities for reproduction in the still-picture mode is limited to combinations of fields which belong to the same set.

Figure 5:
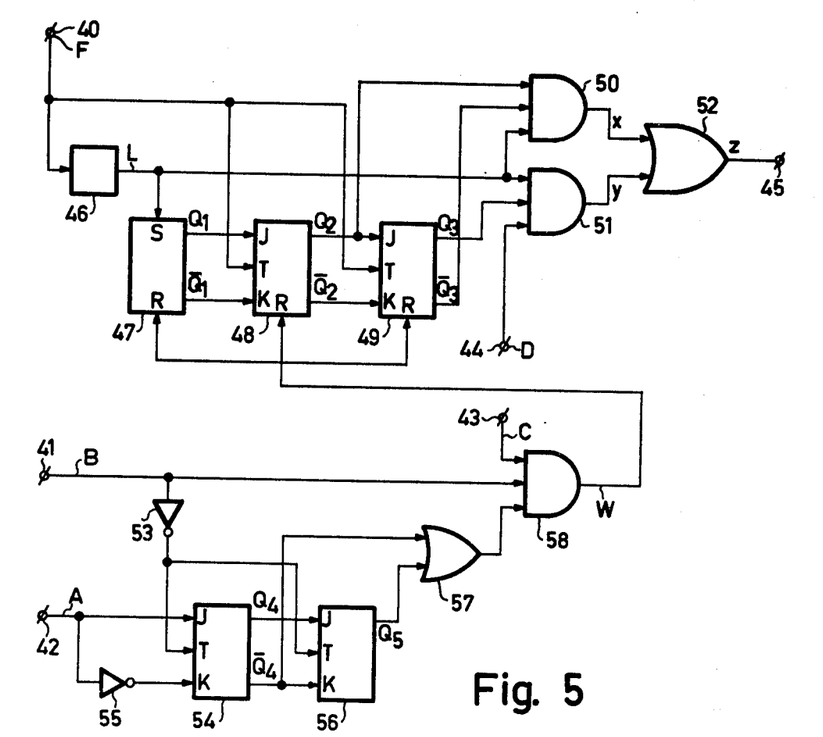
FIG. 5 shows a form of the selection means which may be used in the read apparatus of FIG. 3, FIG. 6, including a–c, shows the signals appearing therein in the various scanning modes, and FIG. 7 schematically represents the scanning sequence of the sets of fields thus obtained.

FIG. 5 schematically shows an example of the selection circuit which is based on procedure 1 in accordance with FIG. 4. The selection circuit comprises an input terminal 40 for the vertical synchronizing pulses F which are detected from the read-out television signals by the detector 29 (FIG. 3). These vertical synchronizing pulses F are applied to the clock input T of two JK flip-flops 48, and 49. The J and the K input of the JK flip-flop 48 is respectively connected to the $Q_1$ and $\bar{Q}_1$ output of a flip-flop 47, whilst the J and K inputs of the JK flip-flop 49 are respectively connected to the $Q_2$ and the $\bar{Q}_2$ output of the JK flip-flop 48. The flip-flop 47 has a set input S which is connected to a circuit 46. This circuit 46 receives the field pulses F at its input from which it derives pulses L which viewed in time are situated between the field pulses and, as the case may be, an indication signal associated with a relevant field. For this it is thus assumed that the indication signal is situated some time after the vertical synchronizing signal. For this purpose the circuit 46 may for example consist of a monostable multivibrator which is triggered by the trailing edge of a field pulse. The selection circuit furthermore comprises two AND-gates 50 and 51. The AND-gate 50 comprises three inputs which are respectively connected to the $Q_2$ output of JK flip-flop 48, the $\bar{Q}_3$ output of JK flip-flop 49, and the output of circuit 46. The AND-gate 51 comprises three inputs which are respectively connected to the output of the circuit 46, the output $Q_3$ of the JK flip-flop 49 and a control terminal 44. The outputs X and Y of these two AND-gates 50 and 51 are connected to the inputs of an OR-gate 52, whose output Z is connected to an output terminal 45. This output terminal 45 constitutes the output of the selection circuit and consequently corresponds to the output of the circuit 31 in FIG. 3.

The selection circuit of FIG. 5 furthermore comprises an input terminal 41 to which the indication signals B detected by the detector 30 (FIG. 3) are applied. This indication signal B is applied via an inverter 53 to the clock input T of a JK flip-flop 54. The J-input of said JK flip-flop is connected to an input terminal 42, which via an inverter 55 is connected to the K-input of this JK flip-flop 54. The outputs $Q_4$ and $\bar{Q}_4$ of this JK flip-flops 54 are again connected to the J and K input respectively of a JK flip-flop 56, whose clock input T also receives the inverted indication signals (pulses). The output $Q_5$ of this JK flip-flop 57 and the output $Q_4$ of the JK flip-flop 54 are connected to the inputs of an OR-gate 57. The circuit finally comprises another AND-gate 58 with three inputs which are respectively connected to an input terminal 43, the input terminal 41 and the output of the OR-gate 58. The output W of this AND-gate is connected to the reset inputs R of the flip-flops 47, 48 and 49.

The scanning mode of the read apparatus is determined by the logic levels of the control signals C, D and A at the respective control terminals 43, 44 and 42. In the following table the combinations of logic levels of these control signals in the corresponding scanning modes are indicated.

| C | D | A | Mode |
|---|---|---|------|
| ⊕ | 0 | — | normal forward |
| 0 | 1 | — | backward |
| 1 | — | 0 | still-picture |
| 1 | 0 | 0 1 0 | one picture forward |

-continued

| C | D | A | Mode |
|---|---|---|------|
| 1 | 1 | 0 1 0 | one picture backward |

As long as the signal C is a logic 0 either normal scanning the recorded video signal is obtained (D=0) or the recorded program is scanned backwards (D=1). Signal A is then irrelevant. If signal C is a logic 1 and signal A a logic 0 the still-picture mode is switched on irrespective of signal D. If the signal A is a logic 1 for a certain time, one picture is scanned in the forward direction (D=0) or one picture is scanned in the backward direction (D=1).

Figure 6A:
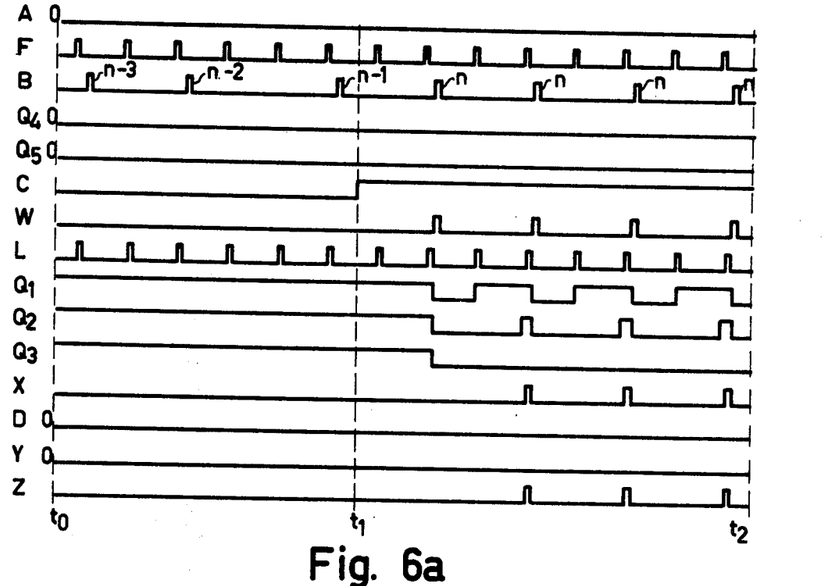
Figure 6B:
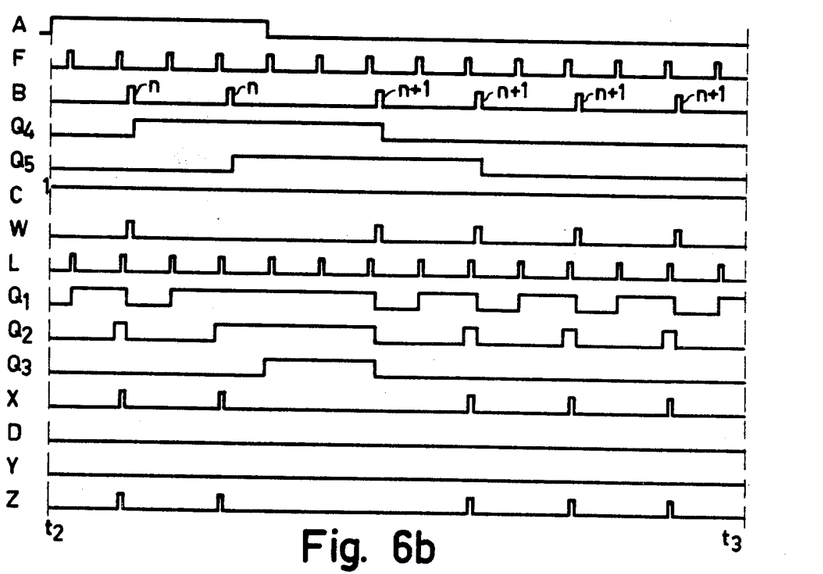
Figure 6C:
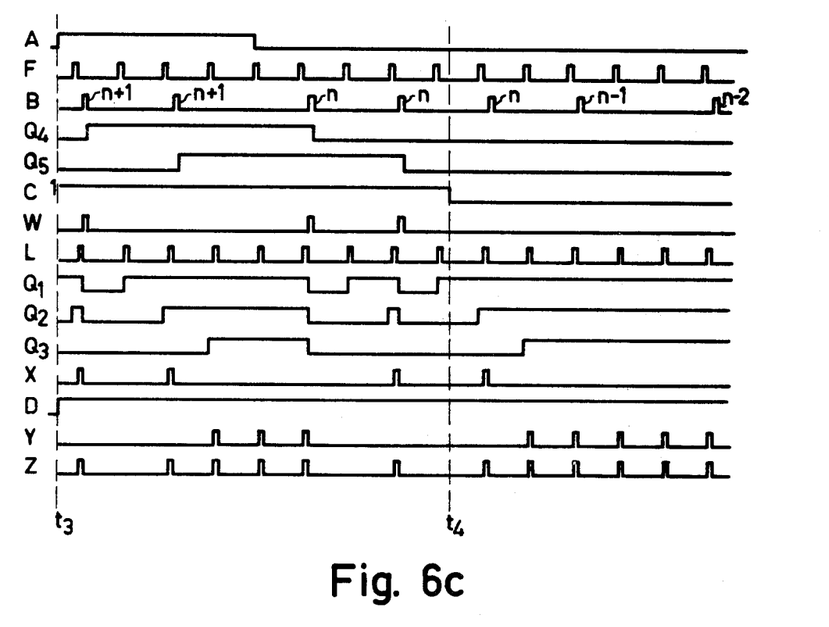

The operation of the selection circuit of FIG. 5 will now be described in more detail with reference to the timing diagrams in FIGS. 6a, 6b and 6c, which give the signals at the various points of the circuits in the various scanning modes.

Figure 7:
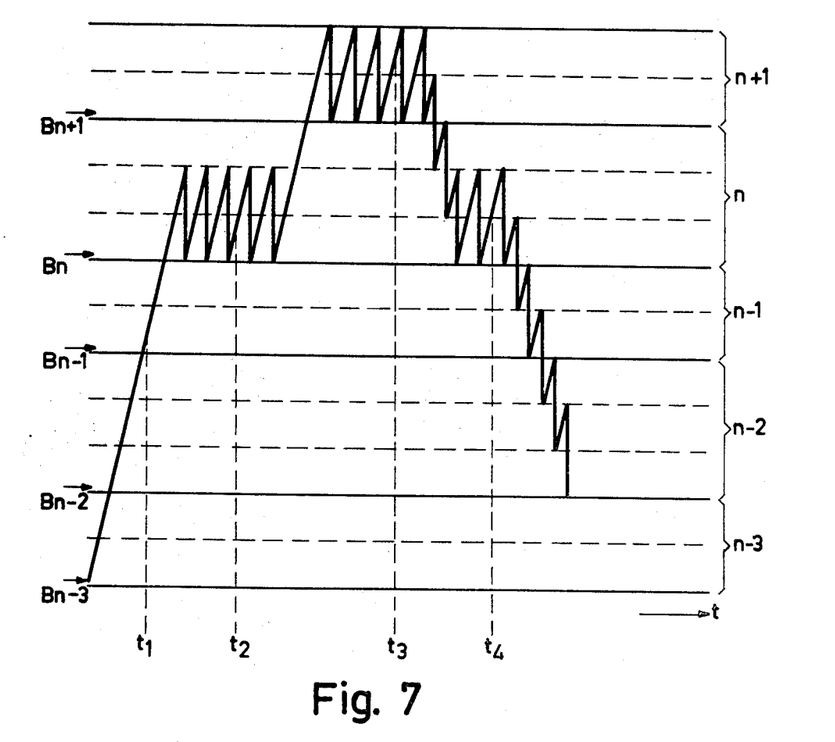

Hereafter the signals at the various points $Q_1$ through $Q_5$, L, X, Y, Z etc. will be designated by the same reference letters as the points themselves. The signal $Q_1$ thus means the signal at the output $Q_1$ of the flip-flop 47 etc. Furthermore FIG. 7 schematically shows the corresponding scanning sequence of a number of consecutive pictures recorded on the record carrier. The vertically plotted units represent a sequence of fields recorded on the disc, i.e. together a part of the spiral track. The first two fields for example stem from a film frame n-3, the following three fields from a film frame n-2 etc. To each set of fields an indication signal B has been added to the first field, which in the Figure is indicated by the number of the relevant film frame. The time axis has been plotted horizontally, so that the diagram shown gives the scanning sequence of the recorded fields.

It is assumed that the control signal C at the control terminal 43 is a logic "0". This means that the output signal W of the AND-gate 58 is always "0", so that the flip-flops 47, 48 and 49 receive no reset pulses. The first pulse L at the set input S of flip-flop 47 will make the signal $Q_1$ "1", a subsequent field pulse F at the clock input T of JK flip-flop 48 will make the signal $Q_2$ "1", and the next field pulse F at the clock input T of the JK flip-flop 49 will make the signal $Q_3$ "1". This situation is continuously maintained as long as the signal C at the control input 43 remains "0", i.e. as long as the flip-flops 47, 48 and 49 receive no reset pulses. It is assumed that this situation exists at the instant $t_0$ in the time diagram of FIG. 6a, so that all outputs $Q_1$, $Q_2$ and $Q_3$ supply a "1" signal. This means that the signal X at the output of the AND-gate 50 is always "0", because the signal $\bar{Q}_3$ is "0". The signal Y at the output of the AND-gate 51 depends on the control signal D at the control terminal 44. It is assumed that this control signal D is "0", so that Y is also "0". This also means that a signal Z at the output of the OR-gate is always "0". Consequently at the output terminal 45 of said selection circuit no command pulse appears which via the switch 26 shown in FIG. 3 and signal source 32 can cause a track jump of the scanning spot. This means that the spiral track on the record carrier is scanned continuously, so that consecutively the fields corresponding to the film frames (n-3) and (n-2) are read.

At the instant $t_1$ (FIG. 6a) the control signal C at the terminal 43 is switched to "1". As it is assumed that the control signal A at the control terminal 42 is already "0" at least from the instant $t_0$, the signals $Q_4$ and $Q_5$ are both "0". As the signal $Q_4$ is consequently "1", the next indication pulse B at the output W of the AND-gate 58 results in a pulse which resets the three flip-flops 47, 48 and 49, so that the signals $Q_1$, $Q_2$ and $Q_3$ become zero. The signal $Q_1$ becomes "1" again owing to the next pulse of the signal L from the circuit 46. The signal $Q_2$ becomes "1" owing to the field pulse F which then follows. The two signals $Q_1$ and $Q_2$ become "0" again owing to the pulse W from the AND-gate 58 which then appears. The signal $Q_3$ remains always "0" under these conditions.

Within the time interval between the instant that the signal $Q_2$ becomes "1" owing to the appearance of a field pulse F and the instant that said signal becomes "0" again owing to the occurrence of a reset pulse W for the flip-flops 47 through 49 a pulse L from the circuit 46 appears. This pulse is transferred via the AND-gate, because the two other inputs of this gate receive a "1" signal, so that at the output X of this AND-gate and thus at the output Z of the OR-gate 52 a pulse appears. This pulse causes a track jump of the scanning spot, so that always the same track circumference, i.e. the same two fields, are read again. This is repeated as long as the control signals C, D and A retain the specified values; during this time the read apparatus consequently remains in the still-picture mode.

At the instant $t_2$ (FIGS. 6a and 6b respectively) the control signal A at the control terminal 42 becomes "1" for a certain time (at least for three field periods). Upon the trailing edge of the next indication pulse $B_n$ the signal $Q_4$ from flip-flop 54 then becomes "1". This indication pulse $B_n$ also results in a reset pulse (signal W from the AND-gate 58) for the flip-flops 47 through 49. The next indication pulse $B_n$ however, does not have this effect, because at the instant at which the next indication pulse $B_n$ occurs, both the signal $Q_4$ from the flip-flop 54 and the signal $Q_5$ from flip-flop 56 are "0", so that the output signal of the OR-gate 57 is "0" and the AND-gate 58 is consequently closed. Owing to the trailing edge of this indication pulse $B_n$ $Q_5$ becomes "1" again, so that after this instant the OR-gate 57 again supplies an "1" to the AND-gate 58.

Owing to the absence of a reset pulse W for the flip-flops 47 through 49 which coincides with the indication pulse $B_n$ not only the signals $Q_1$, $Q_2$ from the flip-flops 47 and 48 respectively becomes "1", but also the signal $Q_3$ from the flip-flop 49. As long as this signal $Q_3$ is "1", i.e. the signal $\overline{Q_3}$ is "0", the AND-gate 50 is closed. As AND-gate 51 is also closed by the control signal D, output terminal 45 cannot supply a command pulse, so that no track jump is effected. Consequently the scanning spot keeps following the track until the indication pulse $B_{n+1}$ associated with the next film frame is detected. As at this instant $Q_5$ is still "1", this indication pulse $B_{n+1}$ via the AND-gate 58 provides a reset pulse W for the flip-flops 47 through 49, as a result of which in a similar way as in the time interval $t_1$-$t_2$ the desired command pulses (Z) are obtained with the aid of the flip-flops 47 through 49 and the gates 50 through 52, so that now the fields corresponding to the film-frame (n+1) are reproduced in the still-picture mode.

For switching one picture backwards the control signal A is switched to "1" for a certain time at the instant $t_3$, and simultaneously the control signal D becomes "1". In a similar way as when switching one picture forwards one of the reset pulses (W) for the flip-flops 47 through 49 is suppressed, so that after the signals $Q_1$ and $Q_2$ have become "1", the signal $Q_3$ also becomes "1". AND-gate 50 is closed during the time that the signal $Q_3$ is "1", i.e. signal $\overline{Q_3}$ is "0". The AND-gate 51, however, is open during this time, so that the signal Y consists of a pulse train corresponding to the signal L from the circuit 46. Via the OR-gate 52 this pulse train is transferred to the output terminal 45, so that after each field period a track jump of the scanning spot is initiated. This continues until another indication pulse $B_n$ is detected. This indication pulse belongs to the preceding film frame and results in a reset pulse W, so that the still-picture mode is restored completely.

If the recorded program is to be played back in a backward direction, the control signal C should become "0" while the control signal D is "1", as is indicated at the instant $t_4$. The signal W consequently remains "0", so that no reset pulses are applied to the flip-flops 47 through 49. After some field pulses F all signals $Q_1$, $Q_2$ and $Q_3$ are consequently "1". This means that the AND-gate 50 is closed. The AND-gate 51, however, completely transfers the pulse train L to the output terminal 45, so that after each field period a track jump is initiated. If in this scanning mode the polarity of the control signal for the drive means 27 (FIG. 3), which signal is supplied by the signal source 32 and which is destined for effecting the track jump, is reversed, a forward track jump will be effected after read-out of one field, i.e. two fields are skipped. Thus, the program is read out in an accelerated manner.

With the example of the selection circuit shown in FIG. 5 it is thus possible to switch on the various scanning modes by the application of the various control signals, whilst it is ensured that in the still-picture mode always the first two fields stemming from the same film frame are reproduced. Obviously, many variants to this circuit are possible, while moveover it is to be noted that the embodiment shown is based on the requirement that in addition to provisions for the still-picture mode the necessary provisions are taken for the other scanning modes. If solely a still-picture mode is required, the selection circuit may of course be considerably simpler.

Reverting now to the table of FIG. 4, the remaining possibilities of adding the indication signal to the television signal and deriving a command signal therefrom for initiating the track jump will be discussed hereafter. In the case of the possibility given under 2 the indication signal, in a similar way as under 1, is always added to the first field of a set. The command signal for initiating the track jump, however, is now not derived from the vertical synchronizing signal but from the indication signal B itself. Thus the track jump is effected immediately after detection of the indication signal.

In the case of possibility 3 the indication signal is added to the second field of each set, while the command signal for initiating the track jump is derived from the next vertical synchronizing signal. Thus, always the first and second field of a set are reproduced in the still-picture mode entirely in accordance with possibility 1.

In the case of possibilities 4 and 5 always the second and third field of a set consisting of 3 fields are reproduced in the still-picture mode, the positions of the indication signals B and the command signals Z being apparent from the table.

Under 6 a special possibility is given, one indication signal being added to each combination of two consecutive sets, namely to the first field of second set. If in the still-picture mode the indication signal B is now used as a command signal Z for initiating the track jump, two fields of the first set are reproduced. However, if the second vertical synchronizing signal $F_2$ after detection of the indication signal is employed as a command signal Z, two fields of the second set are reproduced. By switching between these two methods of obtaining the command signal, consecutive film frames are reproduced in the still-picture mode.

Figure 8:
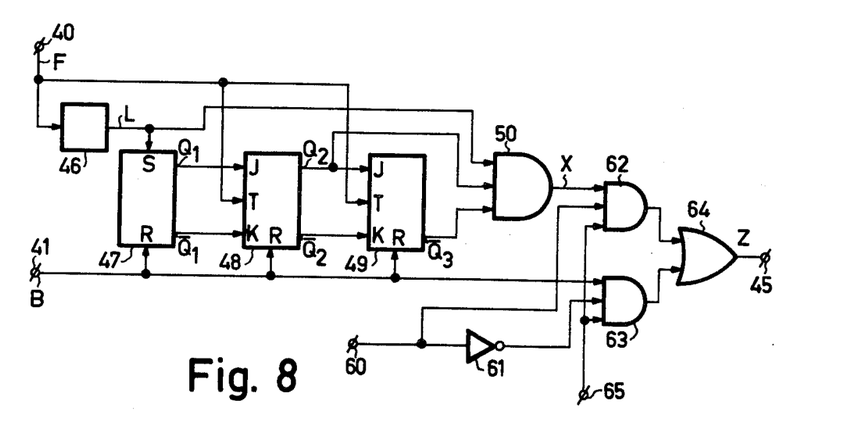
FIG. 8 finally shows an alternative form of the selection means.

For illustration FIG. 8 shows an example of the selection circuit required for this. The section which should supply the second vertical synchronizing signal after the detection of an indication signal B as a command signal, may be substantially identical to the corresponding section of the circuit of FIG. 5 and comprises the flip-flops 47, 48 and 49, the AND-gate 50 and a circuit 46. The output signal X of the AND-gate 50 is applied to an AND-gate 62. This AND-gate 62 furthermore receives a signal from a control terminal 65, which is "1" in the still-picture mode, and a signal from a control terminal 60. If this last-mentioned signal is also "1" the signal X via the AND-gate 62 and the OR-gate 64 thus functions as a command signal Z for initiating the track jump, i.e. the second vertical synchronizing signal $F_2$ after detection of an indication signal B. However, if the control signal at the control terminal 60 is "0", the AND-gate 62 is closed. The command signal Z is then constituted by the indication signal B itself which is then transferred via an AND-gate 63 which furthermore receives the control signal from terminal 60 via an inverter 61 and the signal at the control terminal 65. Depending on the control signal at the control terminal 60 either the scene corresponding to the first set or the second set is reproduced.

In respect of the position of the indication signal within a field period and the shape of this signal the following is to be noted. As previously stated this indication signal is at any rate recorded during the vertical blanking period in order not to disturb the picture to be reproduced. A certain picture line after the vertical synchronizing signal may then be reserved for the indication signal. In order to minimize the risk of interference steps can be taken to ensure that the detection of an indication signal is possible only in the relevant portion of the field period, for which purpose a gate circuit can be included before the detector.

For the addition of an address signal it is for example possible to use a bi-phase signal with the signal values corresponding to white and black of the television signal as logic levels. A number of bits may then serve as indication signal, while the remaining bits may represent the picture number.

Finally, it is to be noted that the invention is by no means limited to the embodiments shown. Both in respect of the scanning sequence at the transitions between the various scanning modes of the read apparatus and in respect of the design of the selection circuit many variants are possible.

What is claimed is:

1. A system for playing back a TV signal from a disc-shaped record carrier, said TV signal having been recorded as a sequence of sets of fields, two fields of said sets of fields having been recorded per track circumference, consecutive scenes of the TV signal corresponding to consecutive sets of two and three fields in accordance with a specific pattern, at least one of said track circumferences thereby containing recorded information corresponding to two consecutive scenes of the TV signal, successive indication signals recorded on said disc during vertical blanking periods and separated by both even and odd numbers of fields, said read apparatus comprising stop-motion means operable in a still picture mode of the apparatus for repeatedly scanning two selected consecutive fields, detection means for sensing said indication signals, and selection means connecting said detection means to said stop-motion means for controlling said stop-motion means to separately scan under the control of said indication signals only those sets of two consecutive fields that correspond to a single scene of the TV signal.

2. A system as claimed in claim 1, wherein an indication signal is added to one field of each set of fields.

3. A system as claimed in claim 2, wherein the indication signal is always added to one of the first or second field of a set and the selection means is such that in the still-picture mode the first and the second field of a set are always reproduced.

4. A system as claimed in claim 1, wherein the indication signal moreover serves as an address signal for the associated set and that the read apparatus comprises a decoding unit for decoding said address signal.

* * * * *